United States Patent [19]
Serizawa et al.

[11] Patent Number: 5,251,135
[45] Date of Patent: Oct. 5, 1993

[54] VEHICLE STEERING CONTROL SYSTEM

[75] Inventors: Mitsuya Serizawa; Yorihisa Yamamoto, both of Saitama, Japan

[73] Assignee: Honda Giken Kogyo Kabushiki Kaisha, Tokyo, Japan

[21] Appl. No.: 764,728

[22] Filed: Sep. 24, 1991

[30] Foreign Application Priority Data

Sep. 25, 1990 [JP] Japan ............... 2-255695

[51] Int. Cl.$^5$ .............................. B62D 5/04
[52] U.S. Cl. ............... 364/424.05; 180/79.1; 180/142
[58] Field of Search ........ 364/424.05; 280/91; 180/79.1, 140–143

[56] References Cited

U.S. PATENT DOCUMENTS

| | | | |
|---|---|---|---|
| 3,866,706 | 2/1975 | Loncke et al. | 180/142 |
| 4,705,131 | 11/1987 | Shibahata et al. | 180/142 |
| 4,942,532 | 7/1990 | Mori | 180/140 |
| 4,998,201 | 3/1991 | Mori | 364/424.05 |
| 5,003,480 | 3/1991 | Mori et al. | 180/142 |

FOREIGN PATENT DOCUMENTS

2-175465  7/1990  Japan .

*Primary Examiner*—Gary Chin
*Attorney, Agent, or Firm*—Irving M. Weiner; Joseph P. Carrier; Pamela S. Burt

[57] ABSTRACT

In a "steer-by-wire" vehicle steering control system which steers steerable wheels with a powered actuator according to an input signal obtained from a sensor associated with a steering wheel, to the end of achieving an optimum vehicle response to a steering input, a compensatory transfer function is introduced between the steering wheel and the powered steering actuator. The compensatory transfer function can be obtained by suitable manipulation of the transfer functions of the hardware involved and a desired overall transfer function. The frequency domain compensatory transfer function is transformed into a time-domain input-output relationship, and the steering mechanism is actuated accordingly as a real time operation. By suitable selection of the desired overall transfer function, it is possible to achieve a vehicle response both stable and favorable.

15 Claims, 9 Drawing Sheets note) "*" denotes a target response

VEHICLE STEERING CONTROL SYSTEM

TECHNICAL FIELD

The present invention relates to a vehicle steering control system, and in particular to a "steer-by-wire" vehicle steering control system which steers steerable wheels with a powered actuator according to an input signal obtained from a sensor associated with a steering wheel.

BACKGROUND OF THE INVENTION

Various electric vehicle steering systems have been proposed which steer steerable wheels with an electric motor according to an input from a steering wheel while taking into account various conditions of the vehicle at the same time, and an example of such "steer-by-wire" steering system is disclosed in Japanese patent publication No. 63-332122 filed by the assignee of the present application.

According to such a steering system, the angular displacement of the steering wheel is detected by a sensor as an electric signal, and an electric motor is actuated according to this electric signal. Typically, the steering angle of the steerable wheels is increased for a given input from the steering wheel when the vehicle is travelling at a relatively low speed, and the steering angle of the steerable wheels is reduced for a given input when the vehicle is travelling at a relatively high speed so that the maneuverability of the vehicle at low speed and the stability of the vehicle at high speed can be both ensured. Furthermore, the freedom of vehicle design can be much improved because there may be no mechanical linkage between the steering wheel and the actuator for actuating the steering mechanism, as opposed to the more conventional steering system in which the steering wheel is mechanically coupled with the steering mechanism. Also, various undesirable problems such as an excessive kick-back to the steering wheel, shimmy and judder can be avoided.

However, according to such a steering system, since the response properties of the electric motor and the vehicle response directly affect the handling of the vehicle, the operator of the vehicle who is familiarized with vehicles equipped with more conventional steering systems may have some difficulty adjusting himself to the behavior of the vehicle equipped with a powered steering actuator.

BRIEF SUMMARY OF THE INVENTION

In view of such problems of the prior art, a primary object of the present invention is to provide a vehicle steering control system which is equipped with a powered actuator and can produce a desired lateral dynamic response of the vehicle to a given steering input.

A second object of the present invention is to provide a vehicle steering control system which is equipped with a powered actuator but allows the vehicle operator to operate the vehicle without experiencing any unfamiliar impression.

These and other objects of the present invention can be accomplished by providing a steering control system for a vehicle, comprising: steering input means; steering mechanism for steering steerable wheels; a powered actuator for actuating the steering mechanism according to a steering input signal from the steering input means; sensor means for evaluating a response of the vehicle to the steering input signal; and compensation means interposed between the steering input means and the powered actuator to modify the steering input signal so that a desired vehicle response to the steering input may be obtained. The vehicle response may be represented either by a yaw rate response or a lateral acceleration of the vehicle to a steering input.

Thus, by suitable selection of the transfer function of the compensation means, it is possible to achieve an overall vehicle response which is both favorable and stable. The desired response of the vehicle may be either a constant without any time delay or a first-order time delay transfer function.

Typically, the transfer function of the compensation means includes a second-order derivative term, and a first order integral term. To the end of reducing the interferences from the noises and improving the stability of the system, it is also possible to introduce a second compensation means which multiplies a first-order integral term to the second order derivative term.

BRIEF DESCRIPTION OF THE DRAWINGS

Now the present invention is described in the following with reference to the appended drawings, in which.

DETAILED DESCRIPTION OF THE PREFERRED EMBODIMENTS

Figure 1:
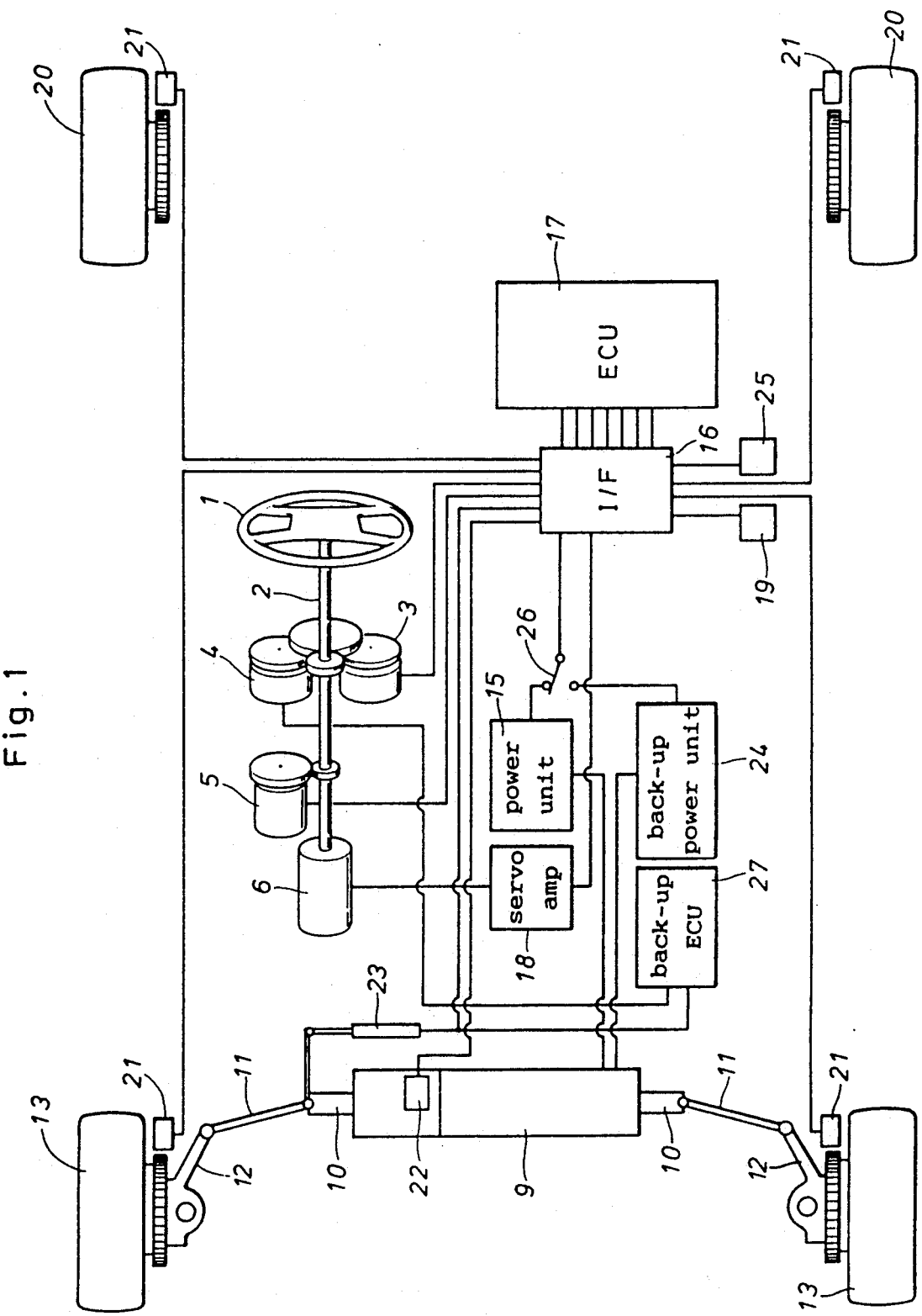
FIG. 1 is a schematic diagram of the overall structure of the vehicle steering control system according to the present invention.

FIG. 1 shows the structure of the front wheel steering system to which the present invention is applied. A steering wheel 1 is attached to the upper end of a steering shaft 2, and the steering shaft 2 is further provided with a pair of potentiometers 3 and 4 for detecting the angular position of the steering shaft 2, an absolute encoder 5 which is described hereinafter, and a secondary actuator 6 for producing a steering reaction force. A front wheel steering unit 9 incorporating an electric motor as described hereinafter is provided in a lower portion of a front part of a vehicle body (which is not shown in the drawings) as a primary actuator. The front wheel steering unit 9 includes a steering rod 10 extending laterally of the vehicle body with each end coupled to one of the front wheels 13 via a tie rod 11 and a knuckle arm 12. The motor 46 (FIG. 3) in the front wheel steering unit 9 is driven by a power unit 15 which is in turn connected to an electronic control unit (ECU) 17 via an interface 16. This ECU 17 is also connected, via the interface 16, to a servo amplifier 18 for controlling the aforementioned secondary actuator 6, as well as to one of the potentiometers 3 and the absolute encoder 5. The outputs from a yaw rate sensor 19 for detecting the yaw rate of the vehicle, a lateral acceleration sensor 25 for detecting the lateral acceleration of the vehicle, four wheel speed sensors 21 each associated with a corresponding one of the front wheels 13 and the rear wheels 20 for detecting the rotational speed of the corresponding wheels 13 and 20, an incremental encoder 22 associated with the front wheel steering unit 9 to detect the position of the steering rod 10 or the actual steering angle, and a potentiometer 23 also for detecting the position of the steering rod 10.

A back-up power unit 24 is provided in parallel with the aforementioned power unit 15 so that the front wheel steering unit 9 may be controlled and actuated even in the case of failure of the power unit 15 by switching over a switch 26 provided between the two power units 15 and 24. The potentiometers 4 and 23 are connected to a back-up ECU 27 which controls the steering of the front wheels 13 in case of failure of the main ECU 17 by controlling and actuating the front wheel steering unit 9 via the back-up power unit 24 according to the steering input obtained from the potentiometers 4 and 23.

Figure 2:
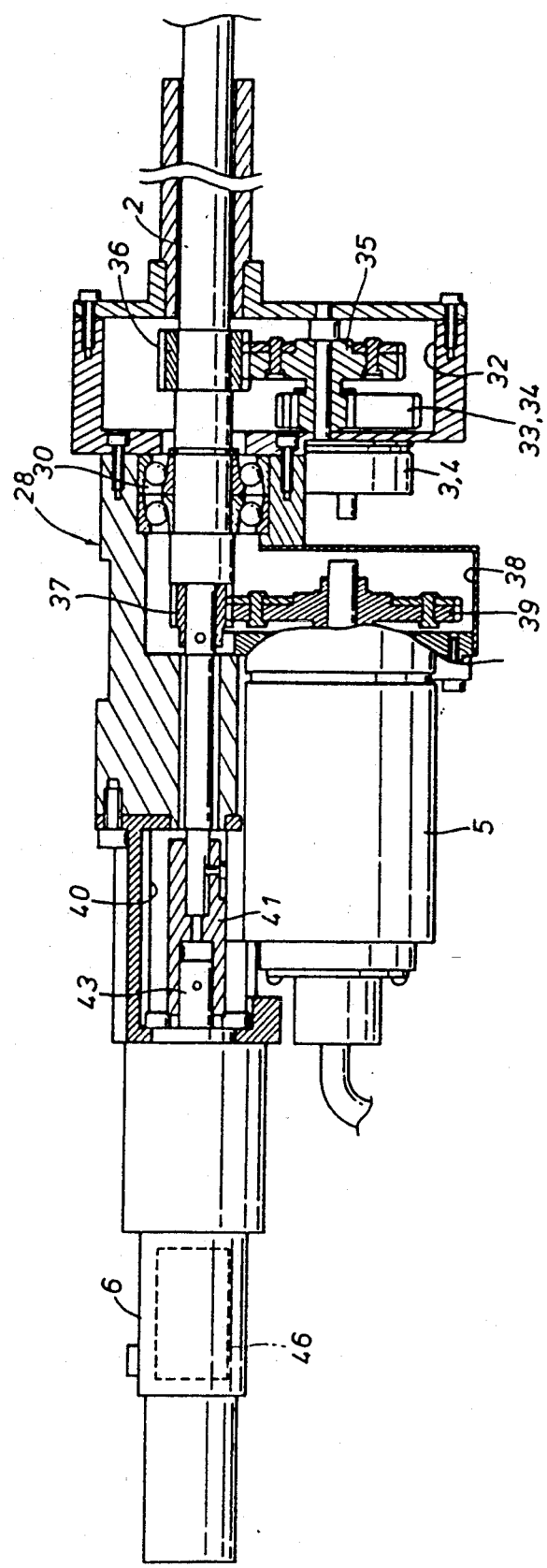
FIG. 2 is a sectional side view of the steering wheel shaft and other related parts of the vehicle steering control system.

FIG. 2 is a sectional view of the structure associated with the steering shaft 2 including the potentiometers 3 and 4, the absolute encoder 5 and the actuator 6. The steering shaft 2 is rotatably supported by a casing 28 via a ball bearing 30, and the casing 28 is in turn securely mounted on the vehicle body via a bracket not shown in the drawings. Driven gears 33 and 34 extending from the potentiometers 3 and 4 supported by the casing 28 are received in a chamber 32 defined in a part of the casing 28. The driven gears 33 and 34 mesh with a drive gear 36 formed in the steering shaft 2 via a counter gear 35.

The left end portion of the steering shaft 2 as seen in FIG. 2 or a lower part of the steering shaft 2 is provided with a drive gear 37 which meshes with a driven gear 39 extending from the absolute encoder 5 in a chamber 38 defined in a middle part of the casing 28. Further, the left end of the steering shaft 2 as seen in FIG. 2 or the lower end of the steering shaft 2 is connected to an output shaft 43 of the actuator 6 incorporating a harmonic drive reduction gear and a DC motor, via a tubular coupling member 41 received in a chamber 40 defined in a left hand side of the casing 28 as seen in FIG. 2.

The counter gear 35, the driven gears 33, 34 and 39 each consist of a gear set combining a pair of gears fixedly and coaxially secured to each other with a slight phase shift so that the play of the gears may be eliminated and the precision in detecting angular displacements may be improved.

Therefore, by operating the steering wheel 1, the driven gears 33 and 34 for the potentiometers 3 and 4, and the driven gear 39 for the absolute encoder 5 are driven in such a manner that the steering angle (steering angle change rate and steering angle acceleration) can be detected. The actuator 6 applies a steering reaction force to the steering shaft 2 via the coupling member 41. The potentiometers 3 and 4 are intended for self-diagnosis and emergency purposes, respectively, and the steering angle is detected by the absolute encoder 5 under normal condition.

Figure 3:
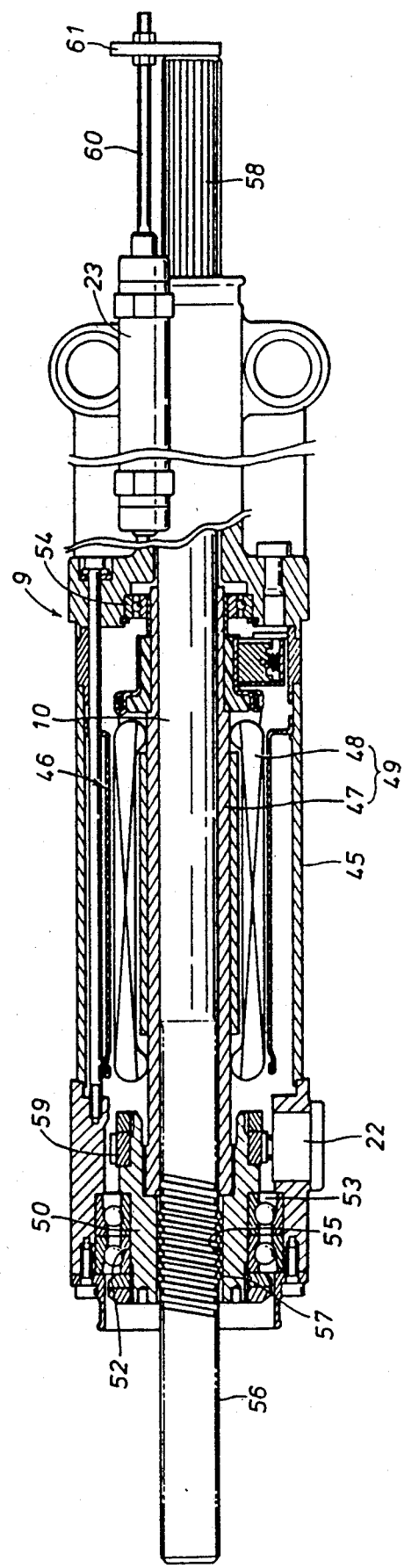
FIG. 3 is a partly broken-away side view of the front wheel steering unit.
Figure 4A:
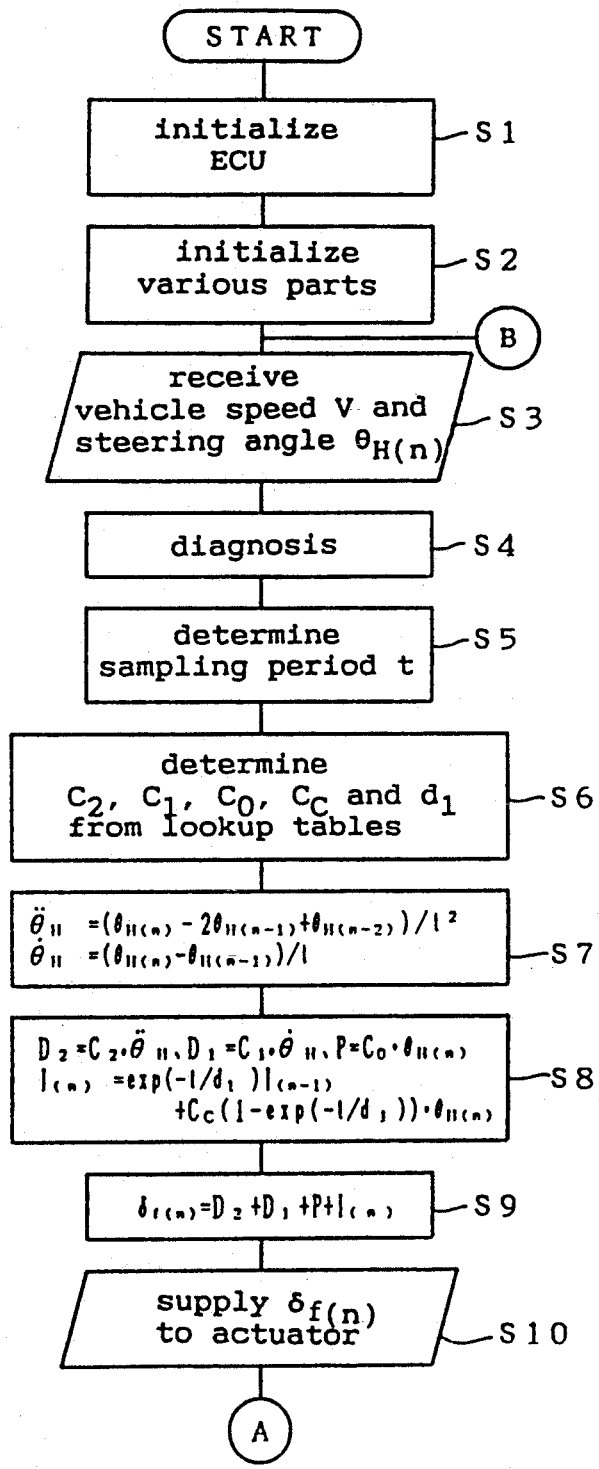
FIGS. 4a through 4c are collectively a flow chart showing the operation of the vehicle steering control system according to the present invention.
Figure 4B:
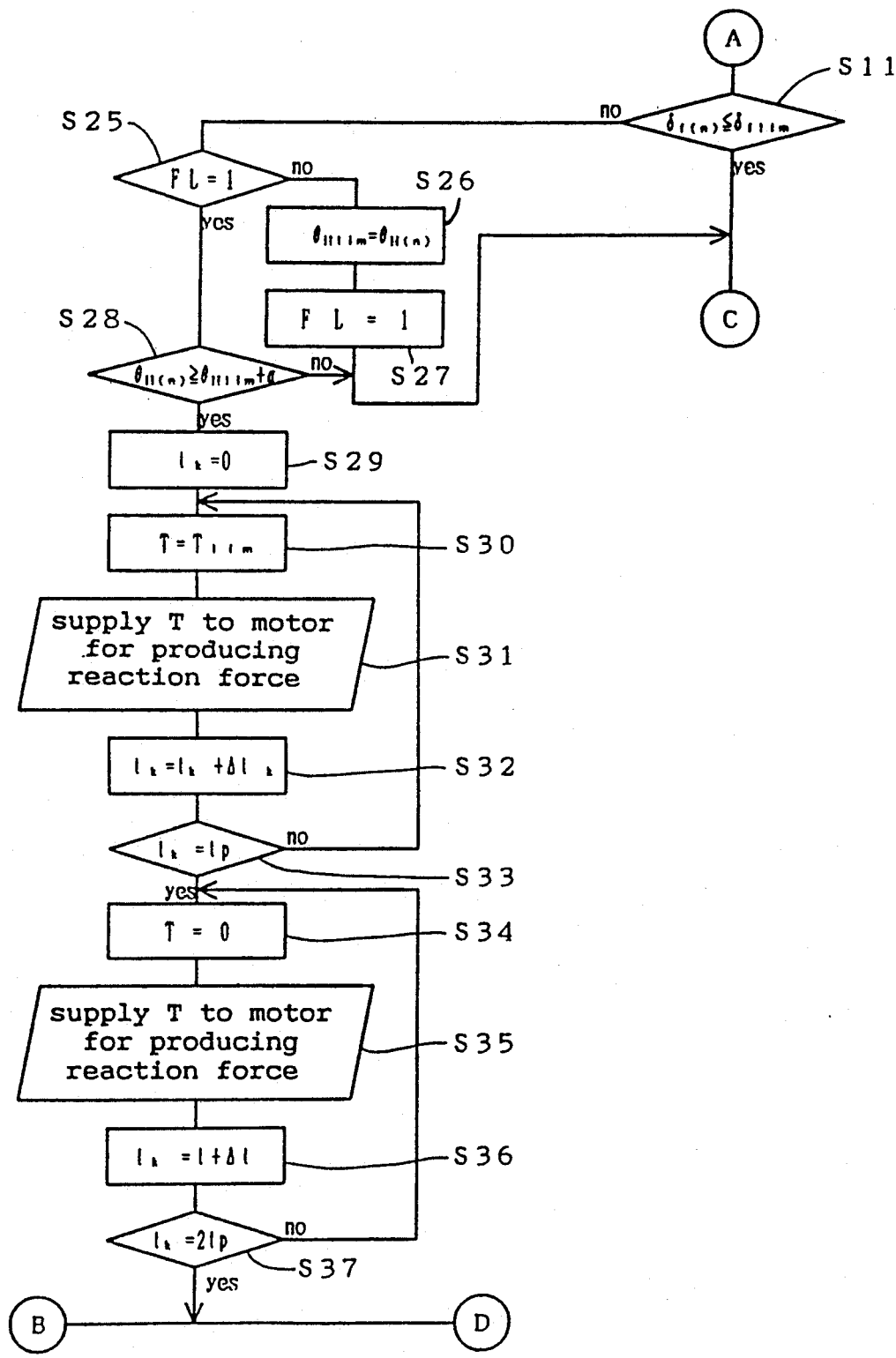
Figure 4C:
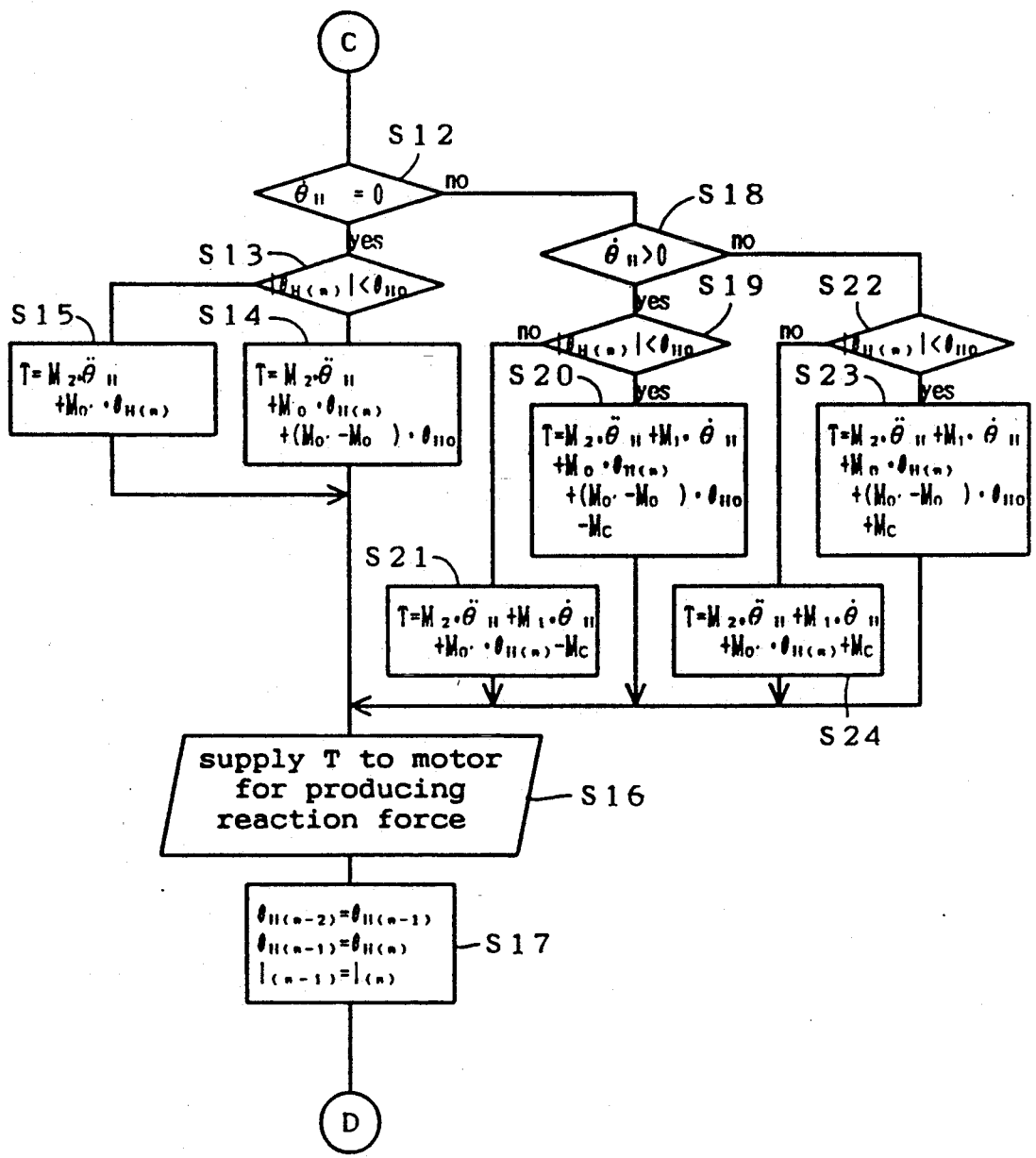

FIG. 3 shows a partly broken-away sectional view of the front wheel steering unit 9 comprising a casing 45 fixedly secured to a vehicle body not shown in the drawing and accommodating the steering rod 10 passed therethrough, the two ends of the steering rod 10 being each coupled to one of the tie rods 11. In a central part of the casing 45 is received the electric motor 46 which comprises a rotor 49 consisting of a hollow rotor shaft 47 rotatably fitted on the steering rod 10 and coils 48 wound around the rotor shaft 47.

An end of the rotor shaft 47 on the left hand side in FIG. 3 is in a threading engagement with a tubular ball nut 50 which is rotatably supported by the casing 45 at a small diameter portion 52 of the ball nut 50 via a ball bearing 53. The other end of the rotor shaft 47 is likewise supported by the casing 45 via a ball bearing 54. The inner circumferential surface of an axially middle part of the ball nut 50 is provided with a plurality of annular grooves 55, and a plurality of steel balls 57 are disposed between the thread formed around the left hand side of the steering rod 10 as seen in FIG. 3 and the annular grooves 55 of the ball nut 50 so that a ball screw mechanism may be formed between the ball nut 50 and the steering rod 10.

When the rotor 49 of the motor 46 is rotated, the rotor shaft 47 is rotated, and this rotational movement is reduced in speed and converted into a linear axial movement of the steering rod 10 by the ball nut 50. A part of the steering rod 10 adjacent the right end thereof as seen in FIG. 3 is provided with a splined portion 58 which cooperates with a corresponding splined bore (not shown in the drawings) formed in the casing 45 for prohibiting the rotation of the steering rod 10.

The outer circumferential surface of the right hand side of the ball nut 50 is provided with a gear profile serving as a pulser 59 which generates a pulse signal in the incremental encoder 22 mounted on the casing 45 for the purpose of detecting the displacement of the steering rod 10 or the actual steering angle from the angular displacement of the ball nut 50. A detection rod 60 extending from the potentiometer 23 attached to the right end portion of the casing 45 is connected to the right end of the steering rod 10 via an arm 61 so that the actual steering angle may be detected from the axial displacement of the steering rod 10.

Now the operation of the present embodiment is described in the following with reference to FIGS. 1, 4a-4c, 5a, 5b, 5c and 6.

Referring to the flow chart given in FIG. 4, the ECU 17 is initialized in step S1, and the steering angle of the steering wheel 1 or the steered angle of the front wheels 13 and other variables are initialized in step S2. In step S3, a steering angle $\theta_{H(n)}$ obtained from the potentiometers 3 and 4 and the absolute encoder 5, a vehicle speed V obtained from the wheel speed sensors 21, a yaw rate obtained from the yaw rate sensor 19 and a lateral acceleration obtained from the acceleration sensor 25 are supplied to the ECU 17. "n" is a count which is incremented for each cycle of program execution.

After a diagnostic routine based on the values obtained by the various sensors is carried out according to a prescribed procedure to ascertain the soundness of the system in step S4, a sampling period t or the interval between each succeeding signal from the various sensors is determined according to the time period required for carrying out an entire cycle of program execution. In step S6, coefficients $C_2$, $C_1$, $C_O$, $C_C$ and $d_1$ corresponding to the vehicle speed V are determined from the tables given in FIGS. 5a, 5b and 5c so that they may be used in various equations which are described hereinafter. Thereafter, in step S7, the steering angular acceleration $d^2\theta_H/dt^2$ and the steering angular velocity $d\theta_H/dt$ are determined as given in the following:

$$d^2\theta_H/dt^2 = (\theta_{H(n)} - 2\theta_{H(n-1)} + \theta_{H(n-2)})/t^2 \quad (1)$$

$$d\theta_H/dt = (\theta_{H(n)} - \theta_{H(n-1)})/t \quad (2)$$

In step S8, it is defined that:

$$C_2 = C_2 d^2\theta_H/dt^2 \quad (3)$$

$$D_1 = C_1 d\theta_H/dt \quad (4)$$

$$P = C_0 \theta_{H(n)} \quad (5)$$

$$I_{(n)} = \exp(-t/d_1)I_{(n-1)} + C_C\{1 - \exp(-t/d_1)\}\theta_{H(n)} \quad (6)$$

In step 59 a steering command value $\delta_{f(n)}$ is obtained from $$\delta_{f(n)} = D_2 + D_1 + P + I_{(n)} \quad (7)$$

When the Laplace transform variable is given by s and the desired transfer function of the steering response is given by f(s), the steering command value $\delta_{f(n)}$ can be obtained by the following Laplace transform equations:

$$\delta_f(s) = G_C(s)\theta_H(s) \quad (8)$$

where $G_r(s)$ is the yaw rate transfer function of the vehicle (or the transfer function of the yaw rate of the vehicle with the input given as the steered angle of the front wheels) and $G_A(s)$ is the transfer function of the actuator 9 with the input given as the angular displacement of the steering wheel 1. If the desired transfer function of the yaw rate response of the vehicle to the angular displacement of the steering wheel 1 is given by f(s), it can be achieved by compensating the yaw rate response of the vehicle as represented by the transfer function $G_C(s)$ defined by:

$$G_C(s) = f(s)/G_r(s)G_A(s) \quad (9)$$

Assuming that the yaw rate gain is purely constant and there is no phase delay or $$f(s) = K \quad (10)$$

and that the transfer function $G_r(s)$ of the yaw rate response of the vehicle and the transfer function $G_A(s)$ of the actuator are expressed by the following forms:

$$G_r(s) = (b_{r1}s + b_{r0})/(a_{r2}s^2 + a_{r1}s + a_{r0}) \quad (11)$$

$$G_A(s) = 1/(a_{A1}s + a_{A0}) \quad (12)$$

where $a_{r2}s$, $a_{r1}$, $a_{r0}$, $a_{A1}$, $a_{A0}$, $b_{r1}$ and $b_{r0}$ are coefficients which are mathematical functions of the vehicle speed and dependent on various parameters of each particular vehicle, one can obtain $$G_C(s) = C_2 s^2 + C_1 s + C_0 + C_C/(d_1 s + 1) \quad (13)$$

where the coefficients $C_2$, $C_1$, $C_0$, $C_C$ and $d_1$ can be obtained by substituting equations (10), (11) and (12) into equation (9).

In the present embodiment, a first-order filter which can be expressed by $1/(\tau_1 s + 1)$ is multiplied to the second-order term of equations (13) or the term $C_2 s^2$ so that the small fluctuations in the angle of the steering wheel may not be picked up by the system as a noise and the stability of the straight ahead movement of the vehicle may be improved without affecting the first derivative term, the proportional term and the integral term, or without affecting the feel of the steering operation as experienced by the operator of the vehicle. Or, $$G_C(s) = C_2 s^2/(\tau_1 s + 1) + C_1 s + C_0 + C_C/(d_1 s + 1) \quad (14)$$

Figure 5A:
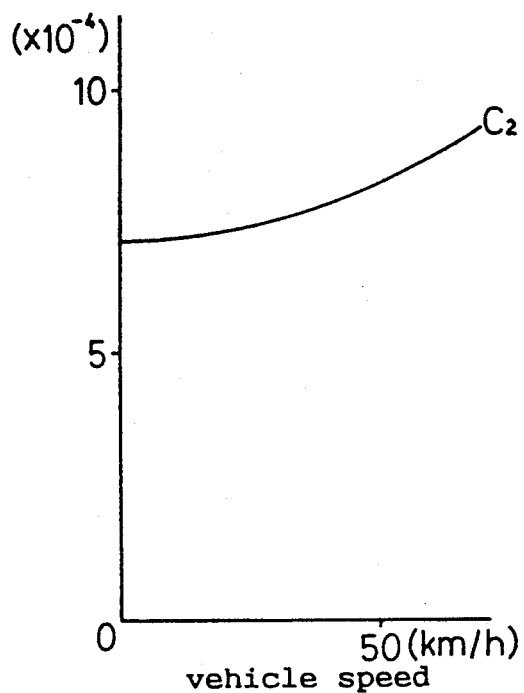
FIGS. 5a, 5b and 5c are graphs showing the contents of the control tables which are employed in the vehicle steering control system according to the present invention.
Figure 5B:
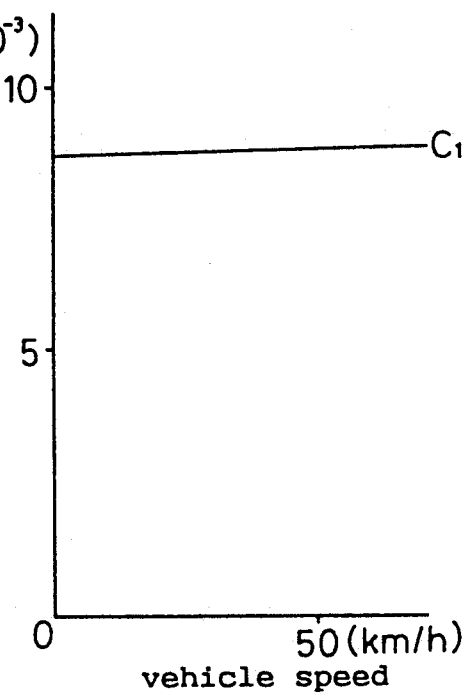
Figure 5C:
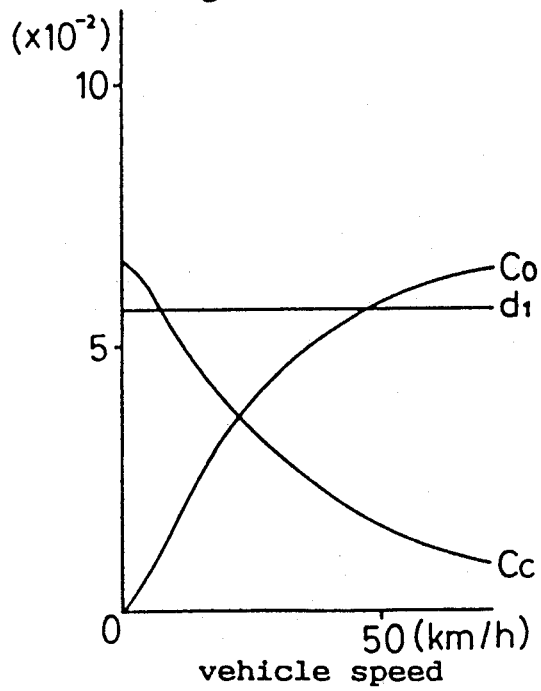
Figure 6:
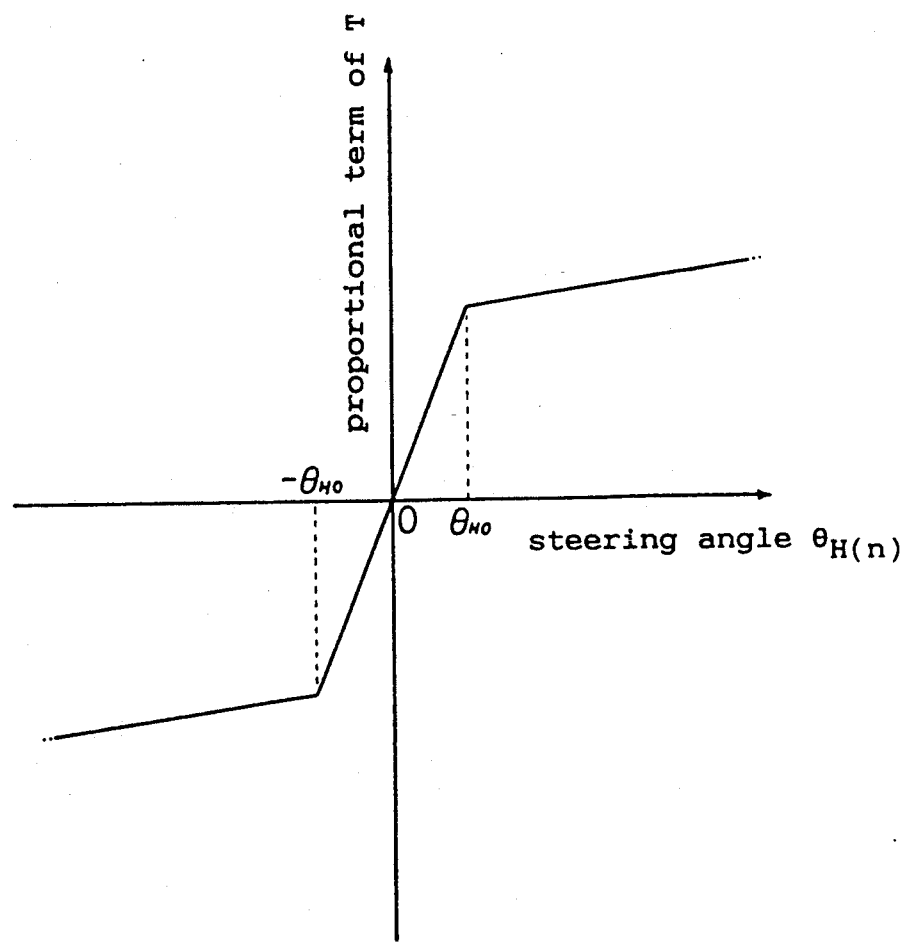
FIG. 6 is a graph showing the relationship between the steering angle and the steering reaction force in the vehicle steering control system according to the present invention.

By converting equation (14) into time domain equations, one can obtain the aforementioned equations (1) through (4). The coefficients $C_2$, $C_1$, $C_0$, $C_C$ and $d_1$ of equations (3) through (6) and (14) can be looked up from tables as given in FIGS. 5a through 5c so that the determination of these coefficients may be carried out quick enough not to impair the proper control operation. Since the coefficients $a_{r2}$, $a_{r1}$ and $a_{r0}$ are mathematical functions of the vehicle speed, the coefficients $C_2$, $C_1$, $C_0$, $C_C$ and $d_1$ are likewise given as values depending on the vehicle speed as indicated in FIGS. 5a-5c.

In step S10, a steering angle command value $\delta_{f(n)}$ is supplied to the actuator 9 via the interface 16 and the power unit 15.

Steps S11 through S37 are steps for producing a steering reaction force to the steering wheel 1. In step S11, it is determined whether the steering angle command value $\delta_{f(n)}$ is less than or equal to a prescribed maximum value $\delta_{flim}$, or, in other words, whether the steering angle command value is less than or equal to the largest possible value. If so, the program flow advances to step S12 and it is determined whether the steering angular velocity $d\theta_H/dt$ is equal to zero or not. If the steering angular velocity $d\theta_H/dt$ is equal to zero or the steering wheel 1 is held at a fixed angle, the program flow advances to step S13 where it is determined whether the absolute value of the steering angle $\theta_{H(n)}$ is smaller than a certain small angle $\theta_{HO}$. If the absolute value of the steering angle $\theta_{H(n)}$ is smaller than this small angle $\theta_{HO}$, a steering reaction force is obtained in step S14 according to the following equation:

$$T = M_2 d^2\theta_H/dt^2 + M_1 d\theta_H/dt + M_{O'}\theta_{H(n)} \pm M_C \quad (15)$$

where $M_2$, $M_1$, $M_{O'}$ and $M_C$ are constants. In this equation, the term $M_2 d^2\theta_H/dt^2$ serves as a term for controlling the resistance of the steering wheel at the onset of each steering operation by accounting for the inertia of the motor rotor 49 and stabilizing the movement of the steering wheel 1, and the term $M_1 d\theta_H/dt$ serves as a damping term for preventing oscillatory movement of the steering wheel 1. The term $M_{O'}\theta_{H(n)}$ facilitates restoration of the steering wheel to its neutral position, and the term $M_C$ counteracts the force arising from the dry friction of the various parts associated with the steering wheel 1. These coefficients may take either positive or negative values depending on the particular steering wheel structure.

If the absolute value of the steering angle $\theta_{H(n)}$ is not smaller than this small angle $\theta_{HO}$ in step S13, a steering reaction force is obtained in step S15 according to the following equation:

$$T = M_2 d^2\theta_H/dt^2 + M_1 d\theta_H/dt + (M_{O'} - M_O)\theta_{H(n)} \pm M_C \quad (16)$$

where $M_O$ is also a constant which is smaller than $M_{O'}$, or $M_O < M_{O'}$.

It means that the stability of the vehicle is improved by increasing the spring term $M_O \theta_{H(n)}$ of the spring reaction force T and enhancing the tendency of the steering wheel to return to its neutral position when the vehicle is travelling straight ahead at high speed and the steering angle is within a prescribed range around its neutral position, and that the force required for steering operation is kept at an appropriately low level when the steering angle is greater than $\theta_{HO}$.

It is also possible to determine $M_O$ from a table as a mathematical function of $\theta_{HO}$ to achieve a highly fine and non-linear property, instead of simply switching over between $M_O$ and $M_{O'}$ according to the magnitude of $\theta_H$ in steps S13, S19 and S22.

In steps S14 and S15, since the steering angular velocity $d\theta_H/dt$ is zero and so is the friction term $M_C$ which changes sign depending on the direction of the steering operation, equations (15) and (16) are actually given by $$T = M_2 d^2\theta_H/dt^2 + M_{O'} \theta_{H(n)} \tag{17}$$

$$T = M_2 d^2\theta_H/dt^2 + M_O \theta_{H(n)} + (M_{O'} - M_O)\theta_{HO} \tag{18}$$

Then, in step S16, the ECU 17 supplies a control signal to the servo amplifier 18 via the interface 16 to actually drive the motor or secondary actuator 6 for producing the reaction force, and in step S17 the variables $\theta_{H(n-2)}$, $\theta_{H(n-1)}$ and $I_{(n-1)}$ are reset as given in the following before the program flow returns to step S3.

$$\theta_{H(n-2)} = \theta_{H(n-1)} \tag{19}$$

$$\theta_{H(n-1)} = \theta_{H(n)} \tag{20}$$

$$I_{(n-1)} = I_{(n)} \tag{21}$$

If the steering angular velocity $d\theta_H/dt$ is not zero in step S12, the program flow advances to step S18 where it is determined whether the steering angular velocity $d\theta_H/dt$ is greater than zero. If the steering angular velocity $d\theta_H/dt$ is greater than zero, the program flow advances to step S19 where it is determined whether the absolute value of the steering angle $\theta_{H(n)}$ is less than $\theta_{HO}$. If the absolute value of the steering angle $\theta_{H(n)}$ is less than $\theta_{HO}$ the program flow advances to step S20 where the steering reaction force T is obtained as given in the following.

$$T = M_2 d^2\theta_H/dt^2 + M_1 d\theta_H/dt + M_{O'} \theta_{H(n)} - M_C \tag{22}$$

When the absolute value of the steering angle $\theta_{H(n)}$ is less than $\theta_{HO}$, the steering reaction force T is obtained in step S21 as given in the following:

$$T = M_2 d^2\theta_H/dt^2 + M_1 d\theta_H/dt + M_O \theta_{H(n)} + (M_{O'} - M_O)\theta_{HO} - M_C \tag{23}$$

If the steering angular velocity $d\theta_H/dt$ is determined to be less than or equal to zero, the program flow advances to step S22 where it is determined whether the absolute value of the steering angle $\theta_{H(n)}$ is less than $\theta_{HO}$ in the same way as in step S19, and the steering reaction force T is obtained in step S23 or S24, depending on the magnitude of the absolute value of the steering angle as given in the following before the program flow advances to step S16.

If the absolute value of the steering angle $\theta_{H(n)}$ is greater than or equal to $\theta_{HO}$, then $$T = M_2 d^2\theta_H/dt^2 + M_1 d\theta_H/dt + M_{O'} \theta_{H(n)} + M_C \tag{24}$$

If the absolute value of the steering angle $\theta_{H(n)}$ is less than $\theta_{HO}$, then $$T = M_2 d^2\theta_H/dt^2 + M_1 d\theta_H/dt + M_O \theta_{H(n)} + (M_{O'} - M_O)\theta_{HO} + M_C \tag{25}$$

If the steering command value $\delta_{f(n)}$ is less greater than $\delta_{flim}$ in step S11, the program flow advances to step S25 where it is determined whether a flag FL which is described hereinafter is "1". If the flag FL is not "1", the program flow advances to step S26 and the currently measured value of the steering angle $\theta_{H(n)}$ is substituted into a variable $\theta_{Hlim}$. Then, "1" is placed in the flag FL in step S27, and the program flow advances to step S12. Thus, the largest possible value of the steering angle can be set up. If the flag FL is "1" in step S25, the program flow advances to step S28 where it is determined whether the steering angle $\theta_{H(n)}$ is sufficiently (or by more than $+\alpha$) greater than $\theta_{Hlim}$; the program flow advances to step S12 if the steering angle $\theta_{H(n)}$ is not sufficiently greater than $\theta_{Hlim}$ and to step 29 if the steering angle $\theta_{H(n)}$ is sufficiently greater than $\theta_{Hlim}$. The cumulative timer $t_k$ is reset in step S29, and the maximum steering reaction force $T_{lim}$ is substituted into the steering reaction force T in step S30. After the steering reaction force T is actually produced in step S31, $\bigcap t_k$ is added to the timer $t_k$ in step S32. In step S33, it is determined whether $t_k$ has reached a prescribed value $t_p$; the program flow returns to step S30 if the prescribed value $t_p$ has not been reached, and advances to step S34 if the prescribed value $t_p$ has been reached.

Zero is substituted into the steering reaction force T in step S34, and the steering reaction force T is actually produced in step S35, while in step S36 $\bigcap t_k$ is added to the timer $t_k$ in the same way as in step S32. In step S37, it is determined whether $t_k$ has reached a prescribed value $2t_p$; the program flow returns to step S34 if the prescribed value $2t_p$ has not been reached and to step S3 when the prescribed value $2t_p$ has been reached. In other words, in steps S25 through S37, the steering reaction force T is oscillated between the maximum value and zero so that the operator of the vehicle may sense that a limit of the steering angle has been reached.

In the above embodiment, the desired behavior of the vehicle was characterized or represented by the yaw rate with a zero phase delay and a constant gain, but it is also possible to use other properties such as the lateral acceleration and the side slip angle.

It is also possible to measure the yaw rate transfer function of the vehicle $G_r(s)$ and the actuator transfer function $G_A(s)$ for different vehicle speeds by using appropriate sensors such as the yaw rate sensor 19 given in FIG. 1, and to determine the coefficients $C_2$, $C_1$, $C_0$, $C_C$ and $d_1$ of the transfer function $G_C(s)$ of equation (14) which will achieve a desired vehicle behavior $f(s)$ by using a Bode diagram and making suitable compensations.

Further, if it is desired that the yaw rate property involves a first order delay with respect to the steering angle $\theta_{H(n)}$ in the above described embodiment, or $$f(s) = K/(\tau_2 s + 1) \tag{26}$$

where $\tau_2$ is a time constant, one can obtain $$G_C(s) = K(a_{A1}s + a_{A0})(a_{r2}s^2 + a_{r1}s + a_{r0})/ \qquad (27)$$
$$(\tau s + 1)(b_{r1}s + b_{r0})$$
$$= C_1 s + C_{0'} + (e_1 s + e_0)/$$
$$(d_2 s^2 + d_1 s + d_0)$$

where $C_{1'}$, $C_{0'}$, $e_1$, $e_0$, $d_2$, $d_{1'}$ and $d_0$ are coefficients which depend on the vehicle speed.

Figure 7:
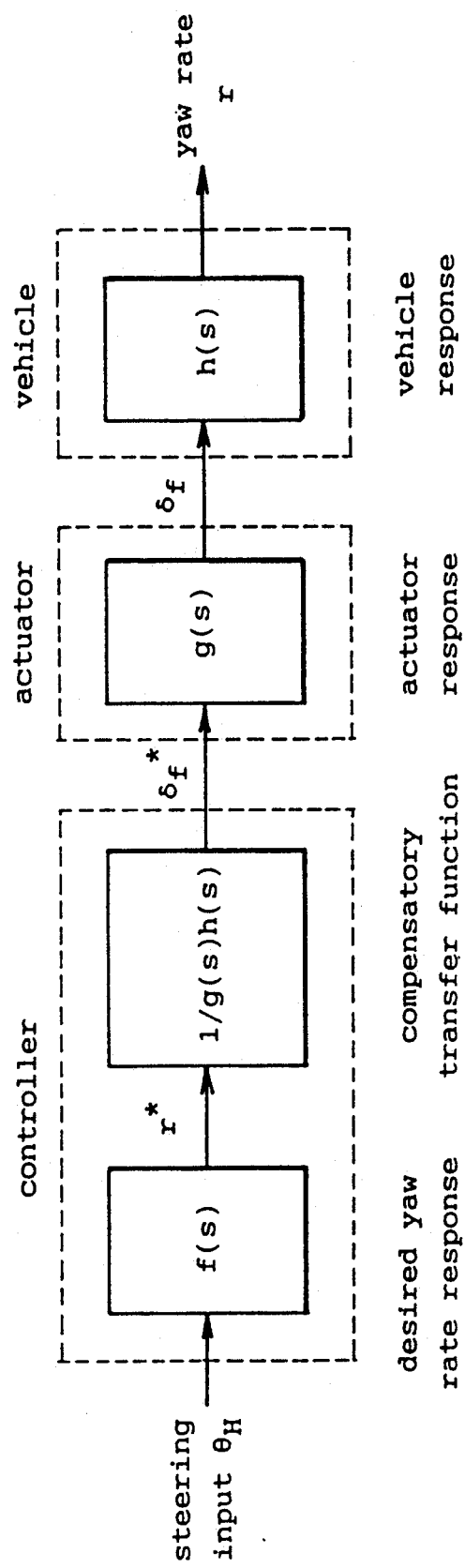
FIG. 7 is a block diagram showing the basic concept of the present invention.

FIG. 7 summarizes the basic concept of the present invention. The transfer function of the steering actuator and the transfer function of the vehicle body are obtained as g(s) and h(s), and a desired overall vehicle response is defined as f(s). The actual yaw rate response of the vehicle to a steering input may be made substantially equal to the desired overall vehicle response f(s) by compensating the uncompensated overall response by a compensatory transfer function 1/g(s)h(s).

According to the present invention, a desired vehicle response property can be easily obtained, and the driveability of the vehicle as well as the feel of the steering operation can be improved by controlling the actuator for activating the steering means through the use of transfer functions which compensate the overall transfer function of the steering actuator and the lateral vehicle response. Even when modifications are made to the actuator and/or the vehicle, a desired vehicle response can be obtained simply by making a corresponding alteration to the compensatory transfer functions.

Although the present invention has been described in terms of preferred embodiments thereof, it is obvious to a person skilled in the art that various alterations and modifications are possible without departing from the scope of the present invention which is set forth in the appended claims.

What we claim is:

1. A steering control system for a vehicle, comprising:
    steering input means;
    a steering mechanism for steering steerable wheels;
    a powered actuator for actuating said steering mechanism according to a steering input signal from said steering input means;
    means for evaluating a response of said vehicle to said steering input signal; and
    compensation means interposed between said steering input means and said powered actuator for modifying said steering input signal based on an output of said evaluating means so that a desired vehicle response to said steering input signal will be obtained by the steering control system.

2. A steering control system according to claim 1, wherein said vehicle response evaluated by said evaluating means is represented by a yaw rate response of said vehicle to said steering input signal.

3. A steering control system according to claim 1, wherein said vehicle response evaluated by said evaluating means is represented by a lateral acceleration of said vehicle to said steering input signal.

4. A steering control system according to claim 2, wherein said desired vehicle response consists of a response with a constant characteristic and which is effected without any time delay.

5. A steering control system according to claim 2, wherein said desired vehicle response consists of a first-order time delay transfer function.

6. A steering control system according to claim 1, wherein said compensation means is adapted to modify said steering input signal by processing said signal with a transfer function including a second-order derivative term, and a first-order integral term.

7. A steering control system according to claim 6, further comprising a second compensation mean which multiplies another first-order integral term to said second order derivative term.

8. A steering control system according to claim 3, wherein said desired vehicle response consists of a response with a constant characteristic and which is effected without any time delay.

9. A steering control system according to claim 3, wherein said desired vehicle response consists of a first-order time delay transfer function.

10. A steering control system according to claim 1, wherein said desired vehicle response is a yaw rate with a zero phase delay and a constant gain.

11. A steering control system according to claim 1, wherein said compensation means is adapted to directly modify said steering input signal.

12. A steering control system according to claim 1, wherein said compensation means includes means for applying a steering reaction force to said steering input means.

13. A steering control system for a vehicle, comprising:
    steering input means;
    a steering mechanism for steering steerable wheels;
    a powered actuator for actuating said steering mechanism according to a steering input signal from said steering input means;
    means for evaluating a response of said vehicle to said steering input signal; and
    compensation means interposed between said steering input means and said powered actuator for modifying said steering input signal based on an output of said evaluating means, said compensation means having a transfer function $$G_C(s) = f_{(s)}/G_r(s)G_A(s)$$

where $f_{(s)}$ is a desired transfer function of a dynamic vehicle response to a steering input signal from said steering input means, $G_r(s)$ is a transfer function of said dynamic vehicle response to a steering input from said steerable wheels, and $G_A(s)$ is a transfer function of an output of said powered actuator to said steering input signal from said steering input means.

14. A steering control system according to claim 13, wherein said vehicle response evaluated by said evaluating means is represented by a yaw rate response of said vehicle to said steering input signal.

15. A steering control system according to claim 13, wherein said vehicle response evaluated by said evaluating means is represented by a lateral acceleration of said vehicle to said steering input signal.

* * * * *

UNITED STATES PATENT AND TRADEMARK OFFICE
CERTIFICATE OF CORRECTION

PATENT NO. : 5,251,135
DATED : October 5, 1993
INVENTOR(S) : Serizawa et al.

It is certified that error appears in the above-indentified patent and that said Letters Patent is hereby corrected as shown below:

Column 5, line 10, change "$C_2=$" to --$D_2=$--;

Column 5, line 18, change "59" to --S9--.

Column 5, line 12, "$D,=$" should read --$C,=$--.

Signed and Sealed this

Nineteenth Day of April, 1994

Attest:

BRUCE LEHMAN

*Attesting Officer*     Commissioner of Patents and Trademarks